United States Patent
Wang et al.

(10) Patent No.: US 10,719,276 B2
(45) Date of Patent: Jul. 21, 2020

(54) SYSTEM FOR PRINTING A DOCUMENT USING A PDF CONVERTER BASED ON A COMPLEX PAGE

(71) Applicant: Kyocera Document Solutions Inc., Osaka (JP)

(72) Inventors: Hui Wang, Temple City, CA (US); Dilinur Wushour, Clayton, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 16/197,861

(22) Filed: Nov. 21, 2018

(65) Prior Publication Data

US 2020/0159473 A1 May 21, 2020

(51) Int. Cl.
*G06F 3/12* (2006.01)

(52) U.S. Cl.
CPC ............ *G06F 3/1212* (2013.01); *G06F 3/125* (2013.01); *G06F 3/1206* (2013.01); *G06F 3/128* (2013.01)

(58) Field of Classification Search
CPC .................................................... G06F 3/1212
USPC ....................................................... 358/1.15
See application file for complete search history.

(56) References Cited

U.S. PATENT DOCUMENTS

| | | | |
|---|---|---|---|
| 6,982,811 B2 | 1/2006 | Sato | |
| 8,891,115 B2 | 11/2014 | Sweet et al. | |
| 2001/0016859 A1 | 8/2001 | Sekido et al. | |
| 2007/0106902 A1* | 5/2007 | Miyata | H04N 1/44 713/176 |
| 2009/0225369 A1* | 9/2009 | Gordon | G06F 3/1212 358/1.18 |
| 2013/0258375 A1* | 10/2013 | Morgana | G06K 15/1822 358/1.13 |
| 2019/0102119 A1* | 4/2019 | Yoshida | G06F 3/1206 |
| 2019/0102125 A1* | 4/2019 | Suzuki | G06F 3/1241 |

* cited by examiner

*Primary Examiner* — Jacky X Zheng
(74) *Attorney, Agent, or Firm* — Millen, White, Zelano & Branigan, P.C.; William Nixon (57) ABSTRACT

A printing device receives a document to print directly from a device. The document is converted into a portable document format (PDF) file. The PDF converter separates the document into different groups that are processed separately to generate multiple PDF files for the document. The PDF files include a first page file and subsequent files for one or more pages separated according to criteria, such as page complexity or size. The separate PDF file is sent to the PDF interpreter to be printed without waiting for the subsequent data within the document.

17 Claims, 8 Drawing Sheets

SYSTEM FOR PRINTING A DOCUMENT USING A PDF CONVERTER BASED ON A COMPLEX PAGE

FIELD OF THE INVENTION

The present invention relates to a system and associated methods for printing a document converted into a portable document format at a printing device. More particularly, the present invention provides efficient methods to print a document on a printer by generating a plurality of portable document format files.

DESCRIPTION OF THE RELATED ART

In some printers, document files having specific formats corresponding to word processing or document generation applications may not be directly printed. In these instances, the documents may require dedicated application software and printer drivers. Direct document printing, however, is growing in popularity in the printing industry. Document format conversion tools are needed to pre-convert a format of a document to a printer supported document format. Even in this environment, high speed document printing is expected.

For portable document format (PDF) printers, certain documents, such as those created with Microsoft Office™, are converted to the PDF format prior to printing. Regular PDF document format is not linearized. Instead, it requires a printer to wait for processing, for example, the first page until all file data has been received. The interpreting information is located at the end of the PDF file for the document. Printing performance becomes an issue in these circumstances, especially for long documents with hundreds of pages.

SUMMARY OF THE INVENTION

A method for printing a document at a printing device is disclosed. The method includes receiving a document at a PDF converter. The method also includes processing a first page of the document. The method also includes generating a first PDF file for the first page. The method also includes determining a subsequent page of the document is a first complex page. The method also includes processing the first complex page. The method also includes generating a second PDF file including the first complex page.

A method for printing a document at a printing device is disclosed. The method includes generating a first PDF file from a first page of the document. The method also includes inserting a first divider string in the first PDF file. The method also includes determining a subsequent page of the document is a first complex page based in a parameter of the printing device. The method also includes generating a second PDF file including the first complex page. The method also includes inserting a second divider string in the second PDF file. The method also includes combining the first PDF file and the second PDF file into an output PDF file from a PDF converter. The method also includes processing the output PDF at a PDF interpreter. The processing includes processing the first PDF file until the first divider string is detected. The processing also includes outputting the first PDF file to print. The processing also includes processing the second PDF file.

A system to print a document at a printing device is disclosed. The system includes a PDF converter configured to generate a first PDF file of a first page of the document. The PDF converter also is configured to determine a subsequent page of the document is a first complex page based on a parameter of the printing device. The PDF converter also is configured to generate a second PDF file including the first complex page. The system also includes a PDF interpreter configured to receive the first PDF file and the second PDF file. The PDF interpreter also is configured to process the first PDF file. The PDF interpreter also is configured to output the processed first PDF file for printing. The PDF interpreter also is configured to process the second PDF file. The PDF interpreter also is configured to output the processed second PDF file for printing.

BRIEF DESCRIPTION OF THE DRAWINGS

Various other features and attendant advantages of the present invention will be more fully appreciated when considered in conjunction with the accompanying drawings.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments relate to an imaging system and method of effectively printing documents. The disclosed system can include a document to PDF converter to convert, separate, and group converted PDF pages to several distinct PDF file based on page sizes, page complexity, page location, and printing device limitations. The divided PDF files are interpreted internally in the MFP separately and sequentially so that system performance can be improved because the first page and early parts of the data for the document can be immediately processed for printing.

In order to solve performance issues, the disclosed embodiments employ a PDF converter that generates a plurality of PDF files for a document instead of a single PDF file. The different PDF files may be generated based on specified parameters, such as document page size, page location within the document, page complexity, and printer device storage limitation. The parameters may be related to capabilities of the MFP, such as data storage. A PDF interpreter performs stream detection to internally separate print jobs for the different PDF files. This feature allows big PDF documents to be processed separately so that the first page and the front part of the document do not need to wait for all data to be received within the MFP to begin printing operations.

The PDF converter may implement a processing flow for a received document. While the PDF converter converts pages of the document to the PDF format as supported on the MFP, it also performs application procedures. First, the PDF converter may obtain the current converted PDF page data size. After the current, or first, page is converted to a PDF page, a PDF page data size is obtained by the PDF converter. The PDF page data size relates to a value that is the maximum size, or number of pages, to be used for a separate PDF file. Printers may have device storage and performance limitations such as disk size, memory size, and printing speed. If the entire PDF document data size is too big it may overflow the device storage or slow down printing speed due to running out of memory. This condition may cause a printing error, thereby resulting in the document not printing. If input data size in the form of the PDF file can be limited to the allowed size for certain devices, then this action should result in good printing performance.

In some embodiments, the PDF converter also accumulates the current page size to the added page size value from previous pages sizes. The PDF converter limits the added page size to a device divided size so that it never overflows the device storage and keep the MFP performing at the best processing speed. After the current page is converted to PDF data, the PDF converter checks for certain conditions. If the conversion of the current page matches one of the conditions, then the PDF converter generates a PDF file without waiting for remaining incoming data.

If the current page is the first processing page of the document, then the PDF converter generates the first page as a separate PDF file. The page does not have to be page 1 of the document, but the first processing page of the document. In other words, if the document has an introduction or other initial page that is not "page 1" of the document, then it may be used for this first PDF file. The generated PDF file may be sent for printing operations.

At the same time that the first PDF file is being generated, the PDF converter continues to convert the second page. Starting from the second page, the size, or number, of pages is accumulated to the added page size value. If the accumulated added page size is greater than a device divide, or file, size, then the PDF converter generates a PDF file without waiting from remaining incoming data. The output PDF file includes pages from the previous un-outputted pages to the current page. For example, if this is the second PDF file after the first page PDF file, then the file size includes the second page up to the current page data.

In alternative embodiments, the disclosed process detects if the current PDF page is complex. "Complex" can refer to a page having increased processing time due to content, graphics, color, and the like. For example, a large color-based raster image takes a considerable amount of time for color conversion. Full page transparency also takes a longer processing time for pixel blending. When a page of a document is too complex, the PDF converter should process this kind of page as soon as possible. When detecting such a complex page, the disclosed process converts and generates the PDF file without waiting for remaining incoming data or pages. A page complex flag may be turned on to indicate that the page should be processed and the PDF file is generated. The output PDF file includes pages from previous processed pages to the current complex page.

How to determine a complex page may depend on parameters or limitations of the MFP. A parameter for determining a complex page may include MFP memory limitations, a device memory limitation of the PDF conversion that takes place away from the MFP, toner levels, and the like. For example, a two-megabyte (MB) picture is embedded in a document. The page with 2 MB picture is received by the PDF converter. The PDF converter compares the data size of the page with a complex parameter value to process the resulting PDF file. The memory of the MFP may be limited to 2 MB of storage such that a larger PDF file would not be printed.

Thus, during the PDF conversion process, the disclosed embodiments check for specific conditions after the current page is converted. If the current page matches one of the specific conditions, then the PDF converter generates a PDF file without waiting for remaining incoming data. This feature speeds up processing for large documents and files. The specific conditions may include being the first page of the documents, having a maximum number of pages or file size, and being a complex page. If the current page does not match a specific condition, then the PDF converter continues to process the next page. The processing continues until a condition is met or the last page of the document is processed.

Figure 1:
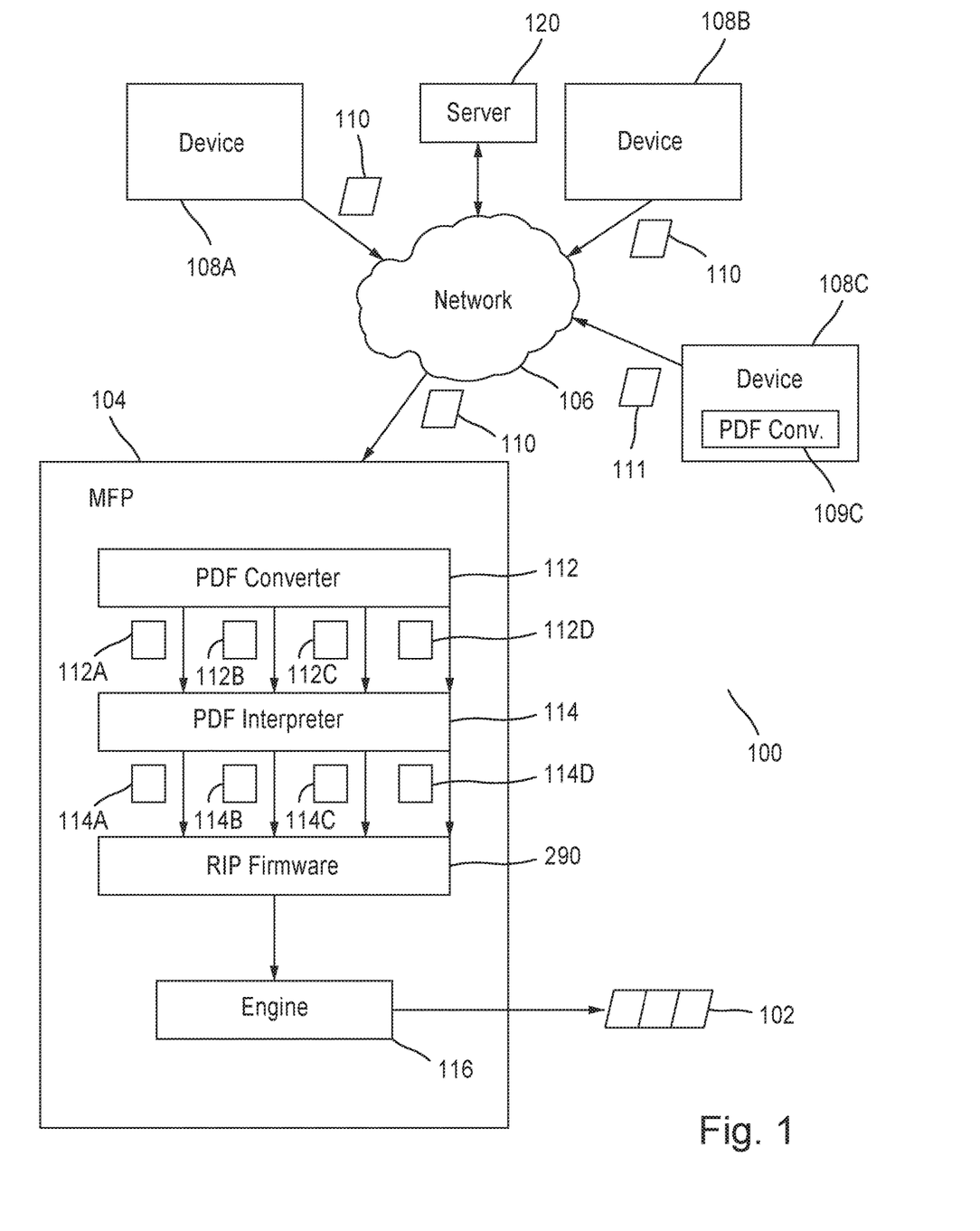
FIG. 1 illustrates a system for printing a document on an MFP according to the disclosed embodiments.

FIG. 1 depicts a system 100 for printing a document 110 on an MFP 104 according to the disclosed embodiments. System 100 shows an example architecture that includes a network 106, which connects various devices and platforms to MFP 104. For example, devices 108A, 108B, and 108C along with server 120 are connected to network 106. The devices may send documents 110 to MFP 104 over network 106. In some embodiments, the devices are mobile or handheld devices that connect to network 106. System 100 provides direct document printing capability to the devices to print at MFP 104. MFP 104 also may be known as a printing device. MFP 104 includes the printing device along with other capabilities, such as a copier device, scanning device, facsimile device, and the like.

Documents 110 are shown being sent to network 106. Network 106 then forwards documents 110 to MFP 104. In other embodiments, the devices may connect directly with MFP 104 such that documents 110 do not go over a network. An example of such an embodiment may be a device connected through a universal serial bus (USB) port or a cable to MFP 104. In some embodiments, the format of a document 110 corresponds to the program that created the documents. Device 108A sends document 110 with a format for a word processing application. Device 108B also sends document 110 with a format for a spreadsheet application. These documents are converted into one or more PDF files at MFP 104.

Once document 110 is received at MFP 104, PDF converter 112 processes the document to generate at least two or more PDF files. These different files are shown in FIG. 1 as PDF files 112A, 112B, 112C, and 112D. PDF files 112A-D are generated according to the processes disclosed below. Thus, instead of one PDF file, document 110 is separated into two or more PDF files according to specific criteria. PDF file 112A corresponds to the first page of document 110. It is the first page in a PDF format. PDF file 112B represents a set of pages starting from the second page of document 110 to a maximum number of pages. The size of PDF file 112B correlates to a complex page of document 110 processed by PDF converter 112. The size of the PDF files may correspond to a parameter of MFP 104, such as disk size, memory size, and printing speed. PDF file 112C also represents a complex page of document 110. In some embodiments, the size of PDF file 112C is similar to the number of pages of PDF file 112B. PDF file 112D may be a complex page or a set of pages of document 110 but includes the final page of the document. PDF converter 112 monitors the conversion of pages of document 110 to determine when to generate a PDF file.

PDF files 112A-D are independent of application software, hardware, and operating systems of devices 108A-C. Each PDF file encapsulates a complete description of a fixed-layout flat document, including the text, fonts, vector graphics, raster images, and other information needed to generate printed document 102. The PDF files also may include logical structuring elements, interactive elements such as annotations and form-fields, layers, rich media (including video content) and three-dimensional objects using universal 3D (U3D) or product representation compact (PRC), and various other data formats.

PDF interpreter 114 receives the PDF files from PDF converter 112. PDF interpreter 114 generates rendering instructions for the PDF files. For example, the instructions may determine how to display the document embodied by the PDF files at MFP 104. PDF interpreter 114 also performs stream detection on PDF files 112A-D to do internal job separation of each file. This feature allows large documents to be processed separately in MFP 104 such that a complex page of one PDF file does not have to wait for a subsequent PDF file to be placed in a print job queue. Thus, PDF interpreter 114 generates processed files 114A-D that correspond to PDF files 112A-D, respectively. In other words, processed file 114A corresponds to PDF file 112A, and so on.

A feature of PDF interpreter 114 is the ability to detect the end of a PDF file and send it downstream for printing. In other words, processed file 114A is sent for printing while PDF interpreter 114 processes PDF file 112B. PDF interpreter 114 may detect or determine existence of a divider string at the end of a PDF file. The divider string indicates that no more pages are to be processed for that PDF file. It may be sent for printing in MFP 104. Divider strings may be used when PDF interpreter 114 receives PDF files 112A-D as a single file. Generation and receipt of such a single file is disclosed in greater detail below.

Raster image processing (RIP) firmware 290 is used to convert PDF files into a raster format suitable for imaging onto paper and other media in printers. RIP firmware 290 outputs a raster image of the pages within processed PDF files 114A-D. RIP firmware 290 may be a processor on MFP 104. After conversion into the raster format, the files are sent to engine 116 as a print job. Engine 116 causes MFP 104 to print printed document 102.

Alternatively, device 108C sends documents 110 already having a PDF format to MFP 104. Device 108C includes PDF converter 109C executing on its computing platform to convert the input document into a PDF file that is sent to MFP 104. The processes regarding providing documents to MFP 104 differ for device 108C than the other devices. This feature is disclosed in greater detail below. Use of PDF converter 109C on device 108C may be applicable if MFP 104 does not support the application generated document 110 thereon. For example, PDF converter 112 does not support the generation of PDF files of documents created with an application on device 108C. It is better to convert the document to a PDF file at device 108C. For simplicity, the PDF files generated by PDF converter 109C also are referred to as PDF files 112A-D.

PDF files 112A-D generated by PDF converter 109C are grouped into an output file 111. Output file 111 differs from documents 110 in that is already converted into a PDF format. Output file 111 is received at PDF interpreter 114, which breaks apart the received file into its separate component PDF files and processes each file individually, as disclosed above. This feature allows for PDF conversion to occur at device 108C so that resources in MFP 104 are not tied up. Further, an application on device 108C may not be supported by PDF converter 112. MFP 104 may be a legacy printer that has not been updated in a long time. Use of PDF converter 109C with PDF interpreter 114 allows for printing on MFP 104 from an unsupported or unrecognized application.

Another feature of PDF converter 109C is that it may send different PDF files to different MFPs. MFP 104 may be busy with other print jobs and only able to process PDF file 112A in a timely manner. PDF converter 109C determines the delay in processing on MFP 104 and sends PDF file 112B to another MFP. Alternatively, it may store subsequent PDF files at server 120 for later retrieval by MFP 104. These features are disclosed in greater detail below.

Figure 2:
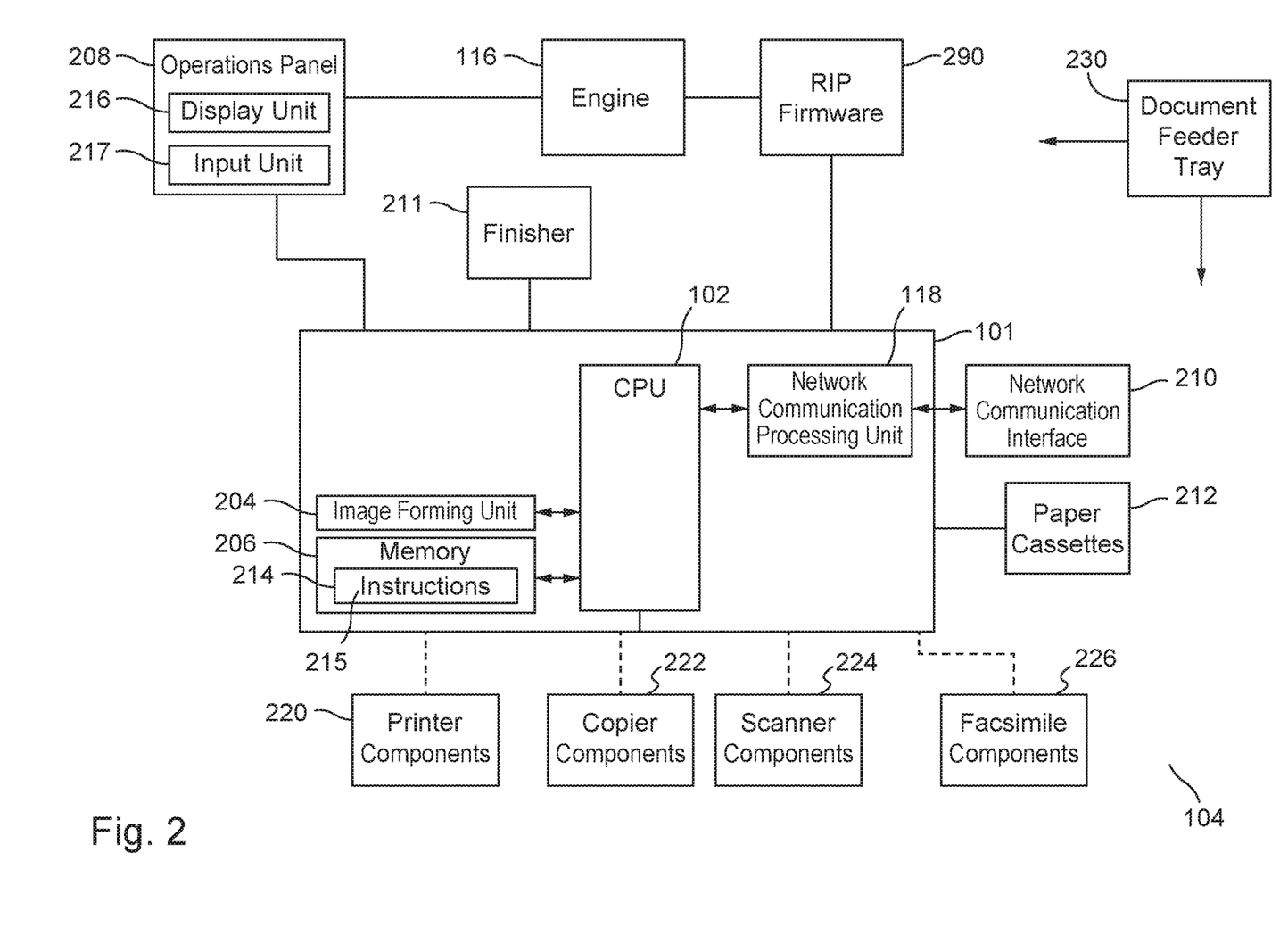
FIG. 2 illustrates a block diagram of components of the MFP according to the disclosed embodiments.

An example of MFP 104 architecture may be shown in FIG. 2. The architecture shown in FIG. 2 may apply to any multi-functional printer or image forming apparatus that scans documents to perform other functions, such as printing, storing, copying, and the like. RIP firmware 290, as shown, is connected to engine 116, which, in turn, is connected to the other components of MFP 104. RIP firmware 290 may receive processed PDF files to print from PDF interpreter 114.

MFP 104 includes a computing platform 201 that performs operations to support these functions. Computing platform 201 includes a computer processing unit (CPU) 202, an image forming unit 204, a memory unit 206, and a network communication processing unit 218. Other components may be included but are not shown for brevity. MFP 104, using computing platform 201, may be configured to perform various operations, such as scanning, copying, printing, receiving or sending a facsimile, or document processing. As such, MFP 104 may be a printing device or a multi-function peripheral including a scanner, and one or more functions of a copier, a facsimile device, and a printer. To provide these functions, MFP 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

MFP 104 also includes a finisher 211 and one or more paper cassettes 212. Finisher 211 includes rotatable downstream rollers to move papers with an image formed surface after the desired operation to a tray. Finisher 211 also may perform additional actions, such as sorting the finished papers, binding sheets of papers with staples, doubling, creasing, punching holes, folding, and the like. Paper cassettes 212 supply paper to the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder tray 230 may be the physical components of MFP 104 to receive papers and documents to be processed. A document is placed on or in document processor input feeder tray 230, which moves the document to other components within MFP 104. The movement of the document from document processor input feeder tray 230 may be controlled by the instructions input by the user. For example, the document may move to a scanner flatbed for scanning operations. Thus, document processor input feeder tray 230 provides the document to scanner components 224. As shown in FIG. 2, document processor input feeder tray 230 may interact with engine firmware 116 to perform the desired operations.

Memory unit 206 includes memory storage locations 214 to store instructions 215. Instructions 215 are executable on CPU 202 or other processors associated with MFP 104, such as any processors within components 220, 222, 224, or 226. Memory unit 206 also may store information for various programs and applications, as well as data specific to MFP 104. For example, a storage location 214 may include data for running an operating system executed by computing platform 201 to support the components within MFP 104. Memory unit 206 also may cache data or files from PDF converter 112 or PDF interpreter 114. Alternatively, memory unit 206 may cache data from PDF converter 109C.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause MFP 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors cause MFP 104 to act as a printer, copier, scanner, and a facsimile device.

MFP 104 also includes an operations panel 208, which may be connected to computing platform 201. Operations panel 208 may include a display unit 216 and an input unit 217 for facilitating interaction with a user to provide commands to MFP 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Input unit 217 includes a touch-screen digitizer overlaid onto display unit 216 that senses touch to receive inputs from the user. By this manner, the user interacts with display unit 216. Devices 108A-C may be connected via operations panel 208 to engine 116.

MFP 104 also includes network communication interface 210. Network communication processing unit 218 may establish a network communication, such as a wireless or wired connection with one or more other image forming apparatuses and a server in an image forming system using network communication interface 210. In some embodiments, CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on MFP 104. CPU 202 also may retrieve information stored in memory unit 206, such as settings for MFP 104.

MFP 104 also includes engine 116. Engine 116 may be a combination of hardware, firmware, or software components that act accordingly to accomplish a task. For example, engine 116 is comprised of the hardware components and software components to print a document. It may receive instructions from computing platform 201 after the user provides inputs via operations panel 208. Alternatively, engine 116 may receive instructions from devices 108A-C.

Engine 116 manages and operates the low-level mechanism of the MFP engine, such as hardware components that actuate placement of toner onto paper. Engine 116 may manage and coordinate the half-toner, toner cartridges, rollers, schedulers, storage, input/output operations, and the like. Raster image processor (RIP) firmware 290 interprets the page description languages (PDLs) to transmit and send instructions down to the lower-level engine 116 for actual rendering of an image and application of the toner onto paper during operations on MFP 104.

Figure 3:
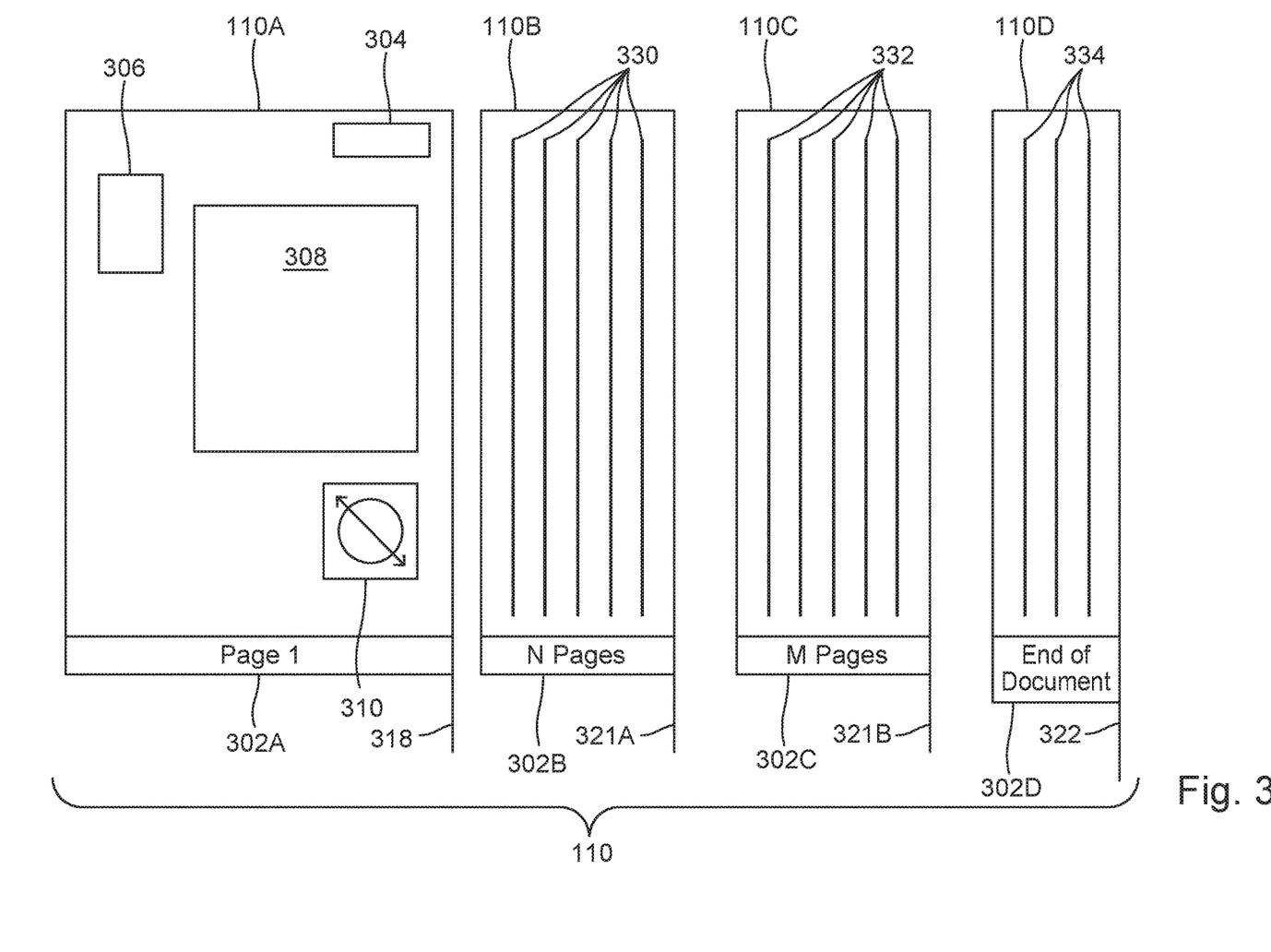
FIG. 3 illustrates an example set of grouped files generated from a document to print on the MFP according to the disclosed embodiments.

FIG. 3 depicts an example document 110 to print on MFP 104 according to the disclosed embodiments. Document 110 is broken into the groups 110A-D that will be used for the PDF files, as determined by the PDF converter. For simplicity, the disclosure of FIGS. 3 and 4 refer to PDF converter 112 within MFP 104. Other PDF converters, such as PDF converter 109C, outside MFP 104 also may be used. These are the groupings that will be determined for the resulting PDF files. Groups 110A-D may correspond to PDF files 112A-D, respectively.

Group 110A of document 110 is the first page of the document. "Pages" are disclosed below, but document 110 also may include slides, tables, pictures, graphics, and the like, or any combinations thereof. The term page is used for brevity. Thus, size 302A of group 110A is one page. PDF converter 112 will process group 110A first. It will determine that it is the first page and stop processing subsequent pages to generate the PDF file. Within the first page, graphics and repeatedly used items may be identified. The graphics and repeatedly used items are cached by PDF converter 112. For example, the identified items from the first page of group 110A may be cached in memory 206. Alternatively, MFP 104 may include another memory location to store the items. For a PDF converter outside MFP 104, the identified items may be cached within the device's memory or at another location within system 100, such as server 120.

Referring to FIG. 3, group 110A includes items within the page. These items may be repeated header 304, repeated graphic 306, and graphic 310. Group 110A also includes text 308 that is not repeated within document 110 and is particular to the first page. PDF converter 112 identifies the items for caching. The disclosed embodiments may identify objects or graphic items that are not text for caching. Graphic 310 may be a logo or other item that takes processing time in PDF converter 112. PDF converter 112 converts it for the first page and caches the converted graphic, in page description language, for use in other parts of document 110. This feature saves time for processing graphic 310 repeatedly.

Repeated header 304 also is identified. PDF converter 112 may identify specific areas of the first page to determine whether headers, footers, salutations, and the like, or any other text/graphic is repeated on every page. The first page also may include repeated graphic 306. This item may be a line at a margin of every page in document 110, a logo, and the like. The first page may include additional repeated items and graphics. Further, the items shown in FIG. 3 may be placed anywhere on the first page. PDF converter 112 also caches the converted page description language for repeated header 304 and repeated graphic 306 along with instructions to determine whether they should apply to the subsequent pages. PDF converter 112 may compare the items with portions of subsequent pages to determine if they apply for processing with those pages.

The feature of caching objects within the first page allows separate groups of PDF files to be formed. A reference library, for example, for document 110 may not be needed or eliminated. Dependencies within the document are broken as processing of pages after group 110A do not need reference back to the first page.

PDF converter 112 also processes text 308. Text 308 may refer to data that is not repeated in document 110 or particularly complex. "Text" may refer to any type of data that is commonly found in documents, and also may include graphics and the like. PDF converter 112 processed text 308 using normal PDF conversion steps. After the first page is converted to PDF data, PDF converter 112 determines that a condition is met to generate a PDF file. In this instance, it is the first page condition. Page size value 318 may be one but it indicates that this is the first page of document 110. Thus, group 110A is converted and PDF file 112A is generated. Size 302A of group 110A is one page. PDF converter 112 may begin processing the second page of document 110.

Group 110B of document 110 differs from group 110A in that it may include multiple pages 330, which includes a complex page. PDF converter 112 will continue processing pages of document 110 into a single PDF file. Each time a page 330 is converted, a complex value size is determined for the current page. A page may be complex if it includes an item on the page that requires additional time to process that exceeds a limit established by a complex value size 321A. This limit may correspond to a parameter of MFP 104 or, in the case of PDF converter 109C, device 108C. The applicable PDF converter limits the complex value size to a file size value so that the MPF or device storage does not overflow. In other words, this feature avoids a condition where the PDF file is too large to store in device memory. It also keeps MFP 104 performing at an optimal processing speed. As shown in FIG. 3, the size of group 110B may be N pages. The number of N pages includes the complex page identified by PDF converter 112 but also any pages preceding the complex page not yet processed into a PDF file. In other embodiments, a page by itself may not exceed the file size value, but it does in combination with the previous pages, such that processing is cut off once the amount of processed data reaches a certain amount. If a complex page is detected, then a complex page flag may be turned on.

PDF converter 112 may retrieve cached objects from group 110A to process within group 110B. This way, group 110B is not dependent on group 110A. Further, the resulting PDF file for group 110B will be independent from the one for group 110A. These objects may include repeated header 304 and repeated graphic 306. If graphic 310 is applicable to one of pages 330, then it also is included.

The same processes may be used for group 110C having pages 332. Pages 332 in group 110C also includes another complex page. Group 110C has M pages. The size of group 110C should be close to that of group 110B, and shown as complex value size 321B. Thus, group 110C also is subject to the limitation in size according to the file size value. This feature keeps the size of the resulting PDF files consistent. The cached objects also may be retrieved to include in processing of pages 332. The file size is checked to see if complex value size 321B exceeds it for this group.

Additional groups may be processed subject to the conditions disclosed above. Processing stops and a PDF file is generated when a page processed by PDF converter 112 is determined to be complex, which results in a file size greater than complex value size 321A or 321B. This process continues until the end of the document is reached. Here, group 110D indicates the final group of pages 334 to be processed. Group 110D may be smaller than groups 110B or 110C. The processing steps do not stop upon reaching a complex value size limit but reaching the last page of the document. This condition may be indicated by the end of document value 322. Group 110D does not necessarily include a complex page. The cached objects from group 110A, or the first page, may be retrieved and applied in the processing of pages 334 as needed.

Figure 4:
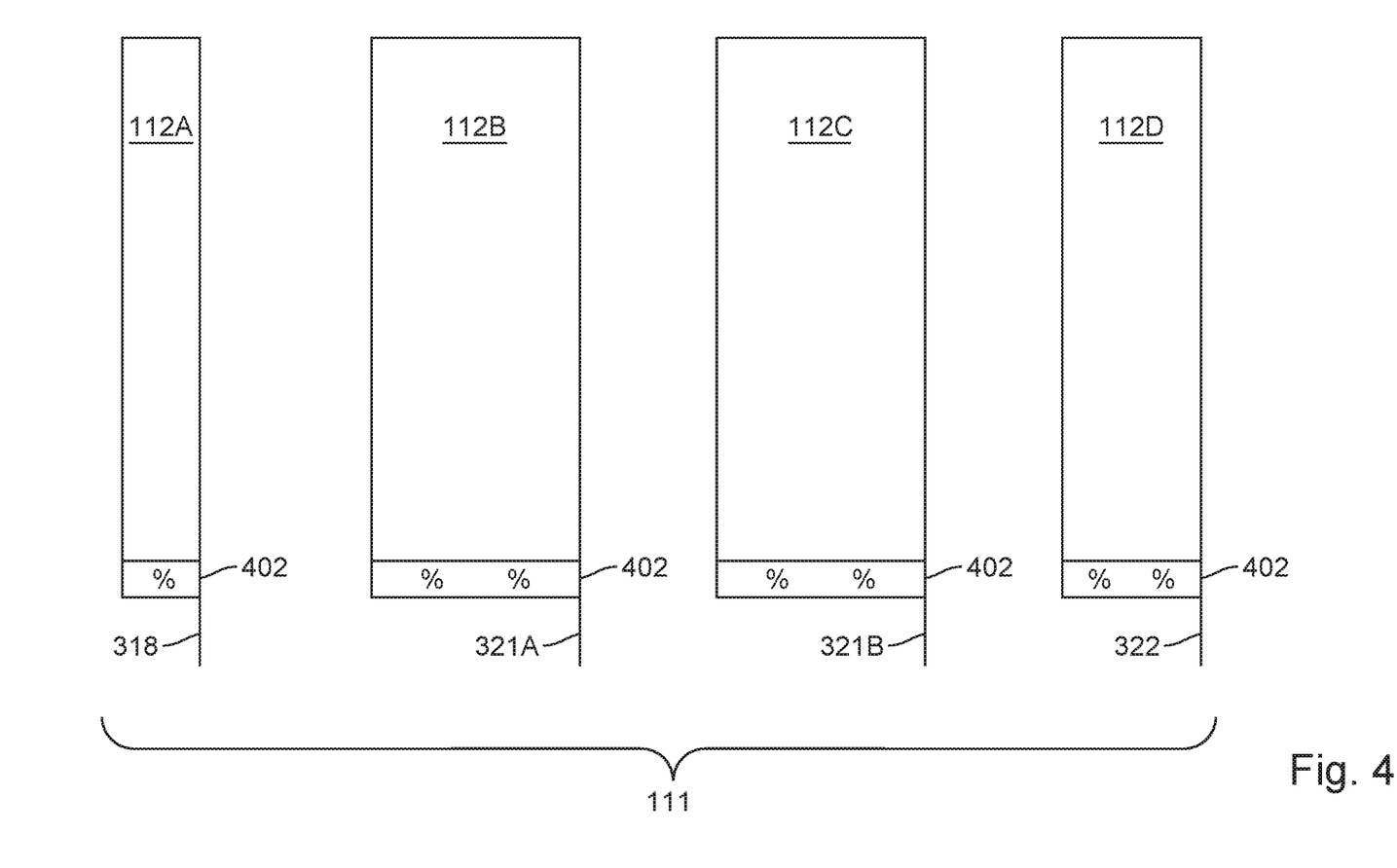
FIG. 4 illustrates PDF files that correspond to the converted groups of pages according to the disclosed embodiments.

FIG. 4 depicts PDF files 112A-D that correspond to the converted groups of pages according to the disclosed embodiments. As noted above, PDF file 112A includes the PDF format data generated from group 110A, PDF file 112B includes the PDF format data generated from group 110B, PDF file 112C includes the PDF format data generated from group 110C, and PDF file 112D includes the PDF format data generated from group 110D. In other words, PDF file 112A represents the PDF data for the first page and has size 318 like group 110A. PDF file 112B represents the PDF data for the N pages and includes the complex page processed therein to generate a complex value size 321A. PDF file 112C represents the PDF data for the M pages and includes the complex page processed therein to generate a complex value size 321B. PDF file 112D represents the last group of pages of the document having a size 322 relative to group 110D.

These files are sent separately to PDF interpreter 114 and, subsequently, to RIP firmware 290 and engine 116 for printing. Because the files are separate, they do not have to be received together to begin printing operations. If PDF files 112A-D are processed by PDF converter 112 of MFP 104, then no further modifications to the data in the files should be needed.

PDF files 112A-D can be processed in a device separate from MFP 104. These files, however, are treated differently, as shown in FIG. 4. PDF files 112A-D may not be sent as separate files from device 109C to PDF interpreter 114. One reason may be that the different files would come into MFP 104 as different print jobs such that the pages of the document are not printed together. This condition would cause confusion and uncertainty with the printed document 102, especially for long print jobs that could have several separate print jobs come into MFP 104 at the same time.

To prevent the problems with separate PDF files, PDF converter 109C places PDF files 112A-D back together as one file, or output file 111 shown in FIG. 1. Output file 111 may be similar to documents 110 in that it is received at MFP 104 as one print job. The output file differs from the non-converted documents in that the PDF files already exist so that the disclosed process of determining specific conditions does not need to occur. The PDF files, however, should be separated to provide the benefit of smaller PDF files for printing operations.

The disclosed embodiments separate PDF files 112A-D by inserting a divider string 402 at the end of each PDF file. Alternatively, divider strings 402 may be placed at the beginning of a PDF file. PDF converter 112 places divider strings 402 into the PDF files before re-grouping them back together. In a sense, output file 111 is a PDF file having two or more sub-files. Upon receipt at MFP 104, the print job manager treats the received file as one print job that is processed by PDF interpreter 114 together.

PDF interpreter 114, however, needs to separate output file 111 into PDF files 112A-D. Thus, it looks for divider strings 402 to separate the PDF files. Upon detection of a divider string 402, PDF interpreter 114 stops processing and sends the PDF file to RIP firmware 290 for printing. Printing operations are not held up waiting for later PDF files to be processed. These features are disclosed in greater detail below.

Figure 5:
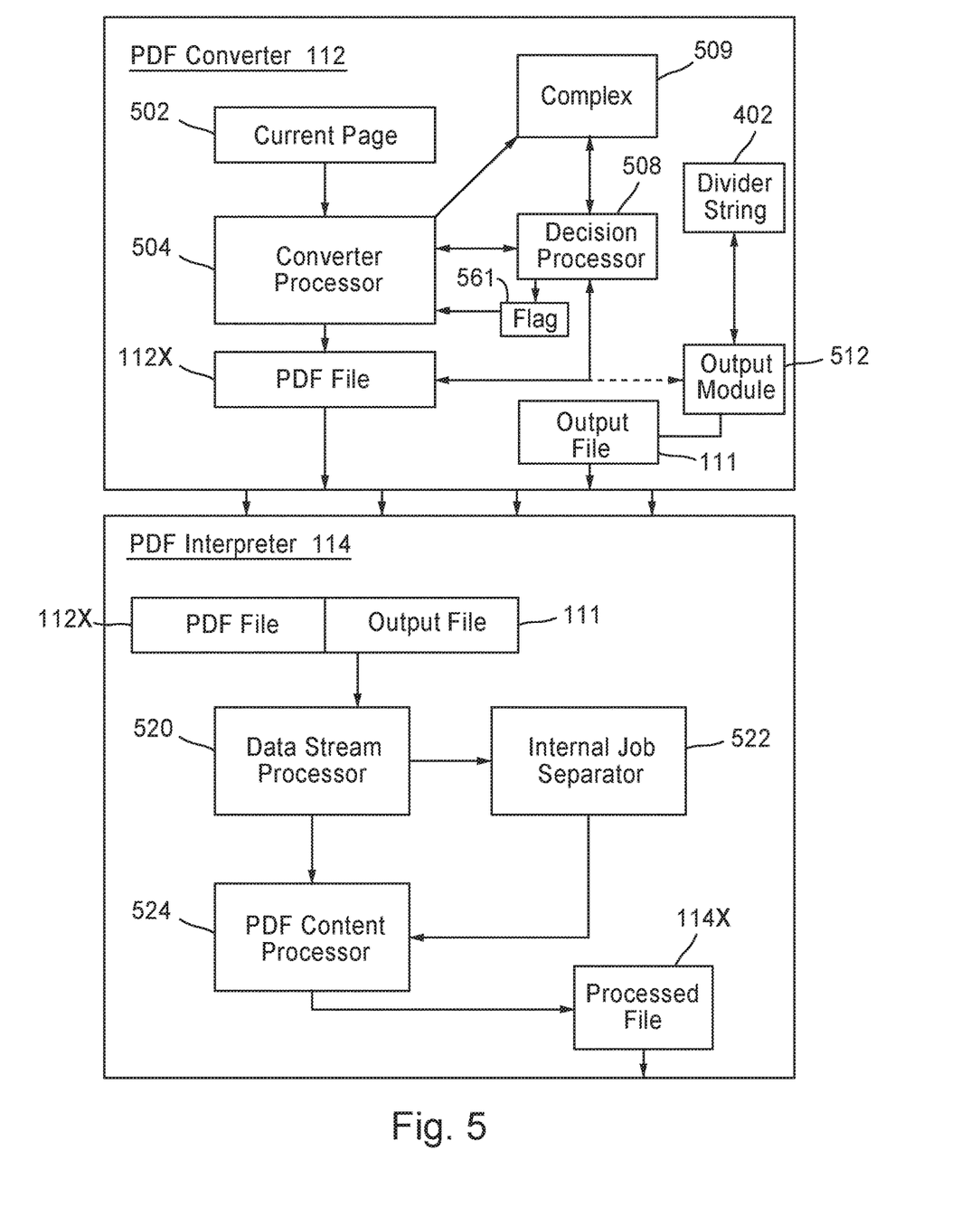
FIG. 5 illustrates a block diagram of the PDF converter and the PDF interpreter according to the disclosed embodiments.

FIG. 5 depicts a block diagram of PDF converter 112 and PDF interpreter 114 according to the disclosed embodiments. FIG. 5 illustrates components that may be implemented in the converter and the interpreter. Although PDF converter 112 is disclosed, the features disclosed below also apply to a PDF converter outside MFP 104, such as PDF converter 109C.

PDF converter 112 received a document 110, preferably with pages or some other discrete part of the document, such as slides, pictures, tables, and the like, or any combination thereof. For brevity, the part of the document for processing by PDF converter 112 may be known as current page 502. The current page is received at converter processor 504, which generates PDF file 112X. PDF file 112X may represent any of PDF files 112A-D disclosed above.

In addition, converter processor 504 also updates current complex value size 509 after current page 502 is converted into a PDF format. Current complex value size 509 may refer to a complex page along with any applicable additional pages. In some embodiments, current complex value size 509 may only refer to the data size of a single page. After the current page is converted and the current complex value size is updated, decision processor 508 checks for specific conditions that will trigger to generate a PDF file. These conditions may include whether current page 502 is the first page of the document. If so, then PDF file 112X is generated. In this instance, PDF file 112X corresponds to PDF file 112A disclosed above.

Another condition may be whether the current page is a complex page. As disclosed above, the limit for current complex value size 509 for one or more pages may correspond to a parameter within MFP 104, such as storage within the device, memory size for storing the converted data, processing speed, printing limitations, and the like. This parameter may correspond to a file size value used by decision processor 508 to detect complex pages. The file size value may reflect the upper limit to process a PDF file in MFP 104. Once the condition is met of reaching this upper limit, then PDF file 112X is generated. In this instance, PDF file 112X may correspond to PDF files 112B or 112C disclosed above.

Other conditions may be implemented, as needed. A final condition may be whether current page 502 is the last page of the document. If so, then PDF file 112X is generated, which corresponds to PDF file 112D disclosed above. Alternatively, decision processor 508 may not be needed to determine the end of document.

If the PDF converter is within MFP 104, then PDF file 112X is forwarded along the printing process, preferably PDF interpreter 114. As the PDF files are generated, they are sent off to be printed. If the PDF converter is located outside MFP 104 then additional components may be used to create output file 111 that includes all of the PDF files generated from document 110. PDF files 112X are sent to output module 512 until the final file is received. As each PDF file is received, divider string 402 is inserted within the file. Preferably, divider string 402 is inserted at the end of the file data by output module 512. Output module 512 then generates output file 111.

PDF interpreter 114 receives either PDF file 112X from a PDF converter in MFP 104 or output file 111 from a PDF converter outside MFP 104. The applicable PDF file is received at data stream processor 520, which monitors the PDF data to identify whether a divider string 402 is within the file. PDF file 112X does not include a divider string, so it passes onto PDF content processor 524. If a divider string is detected, then internal job separator 522 outputs the partial stream data of output file 111 prior to the string to PDF content processor 524. The divided files within output file 111 may be processed separately and sequentially. Processed file 114X from PDF content processor 524 is sent to components in MFP 104 for printing operations, such as RIP firmware 290. Processed file 114X is treated as a single print job. Processed file 114X may correspond to processed files 114A-D disclosed above.

According to some embodiments, a processed file is provided by PDF interpreter 114 without waiting for the entire document to be converted and processed. The different PDF files and processed files fit within the parameters for MFP 104 so that it is not overburdened or inefficient for printing operations. The disclosed embodiments also apply to PDF converters outside MFP 104, where processing is offloaded to free up resources of the MFP.

Figure 6:
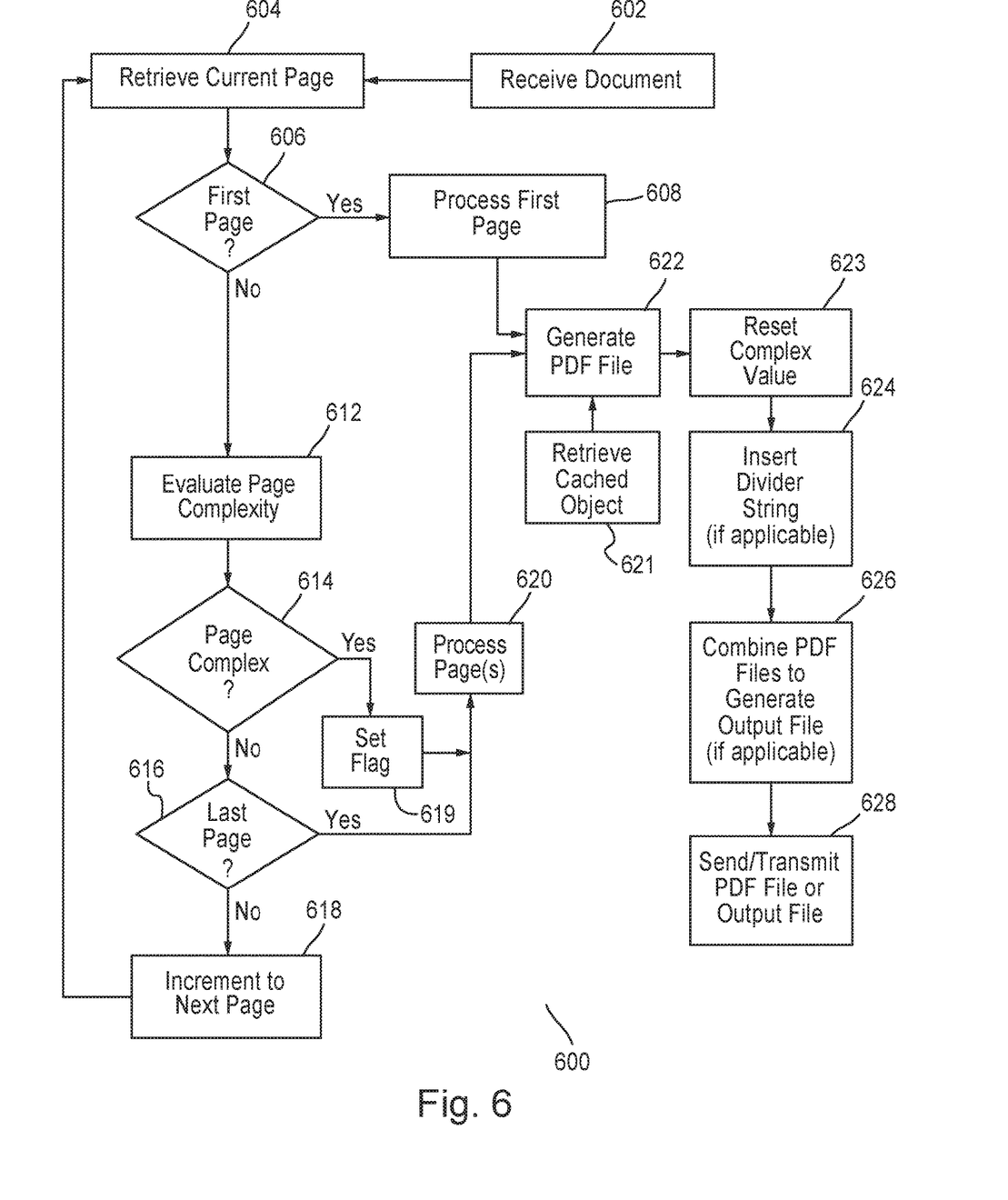
FIG. 6 illustrates a flowchart for printing a document at the MFP according to the disclosed embodiments.
Figure 7:
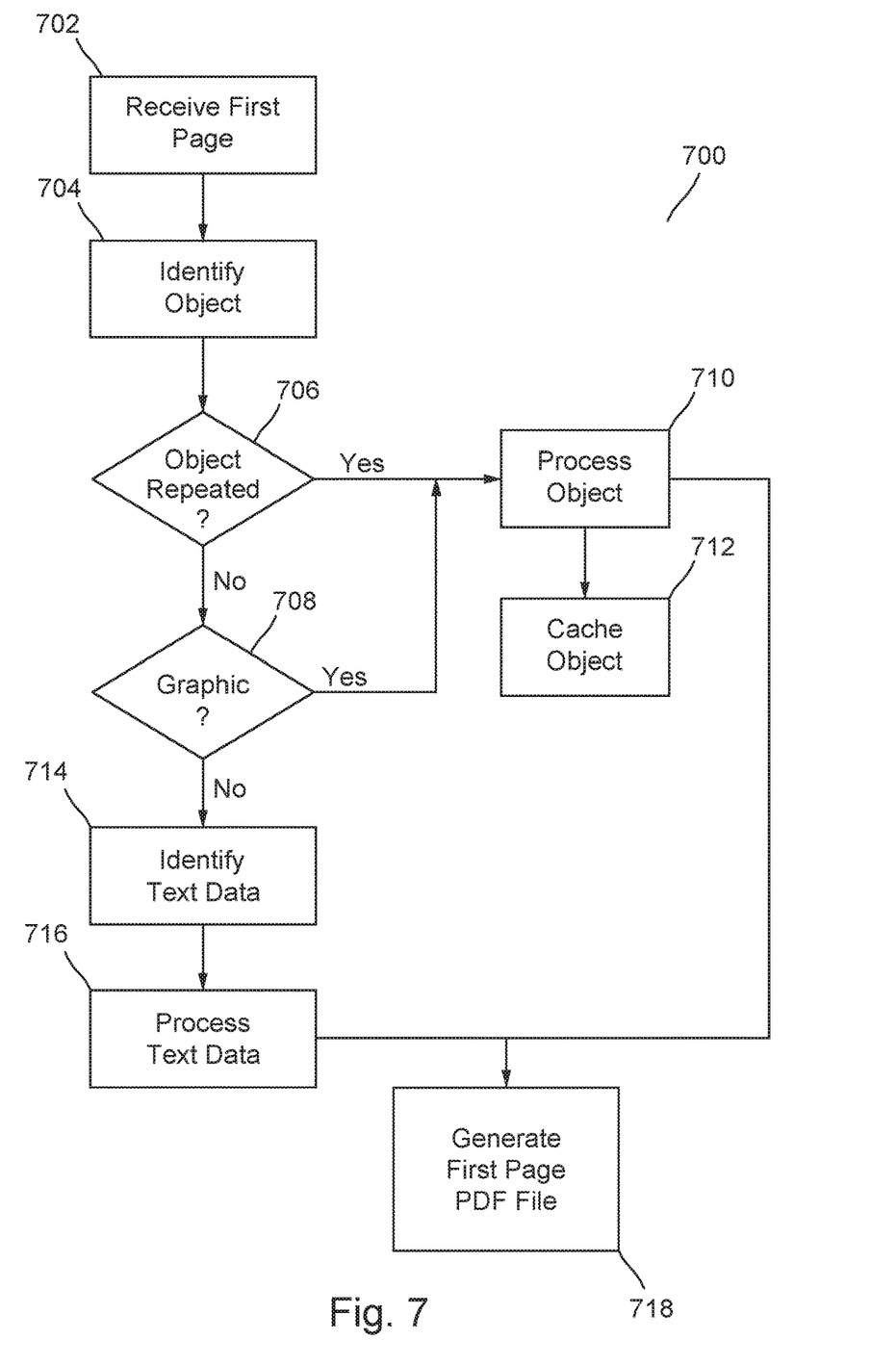
FIG. 7 illustrates a flowchart for processing the first page of a document into a PDF file according to the disclosed embodiments.
Figure 8:
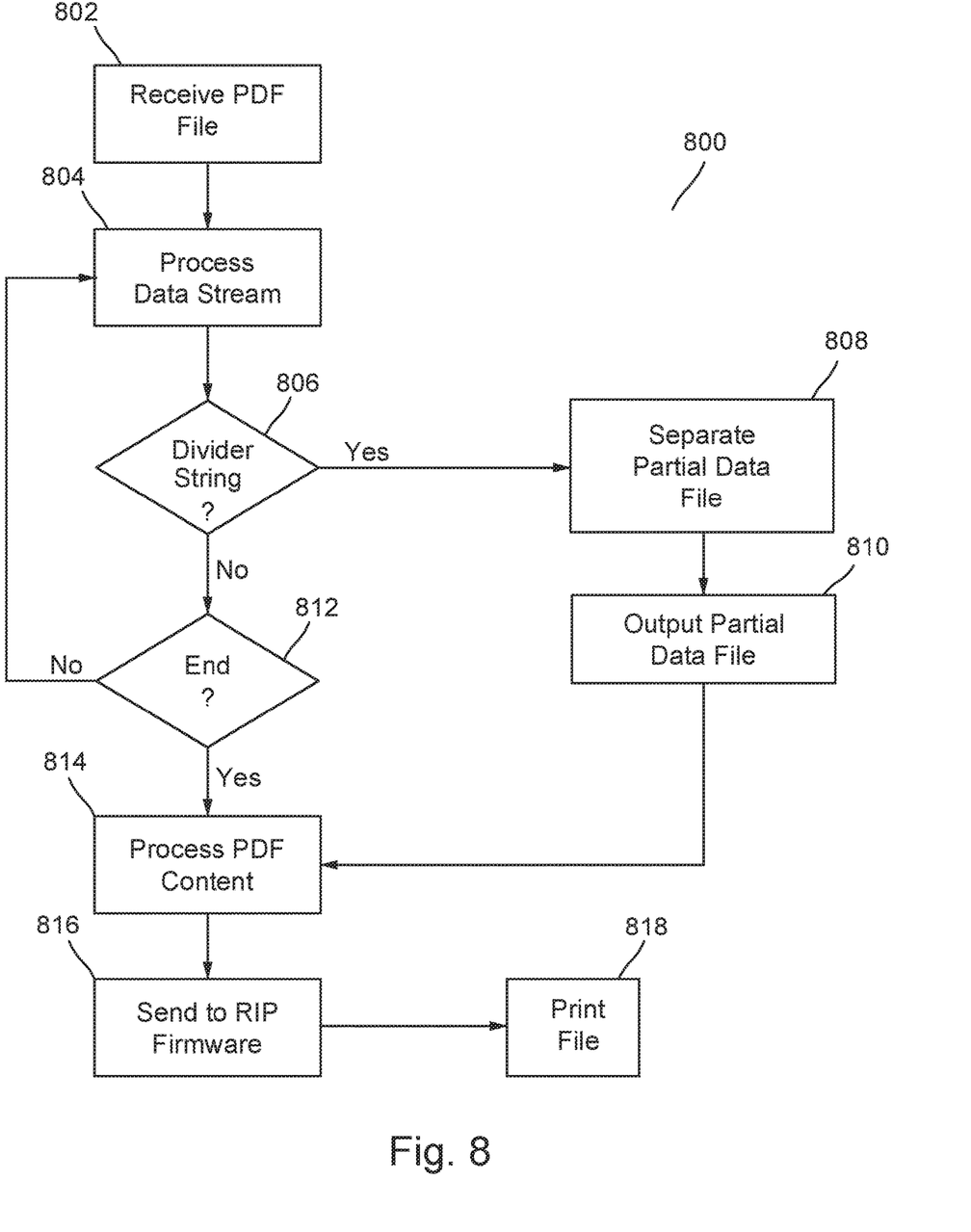
FIG. 8 illustrates a flowchart for processing the PDF files at a PDF interpreter according to the disclosed embodiments.

FIGS. 6-8 disclose processes implemented by the components of system 100 to print a document directly to MFP 104. The components are referenced as disclosed above to illustrate printing the document directly using a PDF converter and a PDF interpreter. Additional components and features also may be used, and the implementation of the processes shown in FIGS. 6-8 are not limited to the components disclosed above.

FIG. 6 depicts a flowchart 600 for printing document 110 at MFP 104 according to the disclosed embodiments. Step 602 executes by receiving document 110 at MFP. Alternatively, document 110 may be received by a printer driver on a device, such as device 108C, which supports PDF converter 109C. Step 604 executes by retrieving current page 502 of document 110 for processing to convert from an application format to the PDF format. Flowchart 600 will process each page until the end of the document is received.

Step 606 executes by determining whether current page 502 is the first page of document 110. The "first page" may be shown by group 110A in FIG. 3. Decision processor 508 of PDF converter 112 may determine that this is the first page of a new document. The first page does not necessarily need to be page 1 of the document and can be the first processing page. If yes, then 608 is executed by processing the first page. The first page is processed separately from the other pages to obtain data that will allow objects and other data to be used in subsequent PDF files. The process for the first page is disclosed in greater detail by FIG. 7. After the first page is processed, flowchart 600 passed to step 622 to generate a PDF file.

If step 606 is no, then step 612 is executed by evaluating the page complexity. Step 612 may execute while the first page is still being processed in step 608. The evaluation of page complexity may include determining the content of the page, including graphics or other unusual data structures. These items will take longer to process and interpret than normal items in a document, such as text. The complex value size for the page is added to the current complex value size 509. If it exceeds a limit, then the current complex value size for the page indicates that it is a complex page.

Complexity may be defined on page processing time. A page that would result in a larger than normal processing time should be in its own PDF file. For example, a large color-based raster image may take an extended period of time for color conversion. Full page transparency blending also may take long time for pixel blending. When a page is too complex, it should be processed as soon as possible without waiting for subsequent pages from document 110. When a complex page is detected, it should be converted to generate the corresponding PDF file without waiting for remaining incoming data.

Current complex value size 509 may be stored in a register and is updated each time a page is converted. Alternatively, the current complex value size may be incremented by the size of the PDF data generated by the converted page. As pages are converted, current complex value size 509 increases.

Step 614 executes by determining whether the current page is a complex page. The parameter may correspond to a file size value, as disclosed above. The parameter may correspond to limitations or parameters of MFP 104. For example, the parameter may correspond to the storage available on MFP 104 for print jobs. Memory 206 or other data storage may have a specific size, such as 2 MB, set aside for print jobs. Thus, when the current complex value size is equal to or exceeds 2 MB, a PDF file should be generated. In some embodiments, a limit may be implemented so as to not exceed the parameter. In this instance, the file size value may be 1.8 MB. When the complex value size exceeds 1.8 MB, the PDF file for this group of pages is generated. A complex page causes the value to be exceeded faster than normal so that the one or more pages are processed.

If step 614 is no, then the current complex value size is within the limits for printing the document. Step 616 is executed by determining whether the current page is the last page of the document. The last page should indicate the end of the document and no more pages are to be processed. If step 616 is no, then step 618 executes by incrementing the processing of the document to the next page. Flowchart 600 returns to step 604 to retrieve the next page for processing.

If step 614 or step 616 is yes, then step 620 executes by processing the complex page along with any previous pages to be converted by PDF converter 112. In some embodiments, step 619 may execute by setting a complex page flag 561. The flag alerts converter processor 504 to begin processing to convert the complex page into a PDF file. Unlike the PDF file for the first page, the PDF files may include multiple pages.

Step 622 executes by generating the PDF file for the first page or the processed pages. As disclosed above, PDF converter 112 generates PDF file 112X. This file is sent as a discrete job file to PDF interpreter 114, if applicable. Otherwise, additional processing may occur as disclosed below. As part of step 622, step 621 executes by retrieving any cached objects or the PDF data for an object identified by the first page processing performed in step 608. This feature is disclosed in greater detail below. Step 623 executes by resetting the current complex value size to zero (0) so that size accumulation starts over for the next group of pages from document 110.

If the PDF converter 109C is used, then additional steps may be executed to process the document into PDF files. The PDF files should be grouped back together to be sent as an output file 111 to MFP 104. This way, the document is received and printed together at MFP 104. Otherwise, the different PDF files may be printed out of order or not together as they would be treated as separate print jobs from device 108C. Thus, step 624 executes by inserting a divider string 402 at the end of each PDF file, if applicable. Alternatively, step 624 may execute after step 622 when the PDF file is generated. Divider string 402 indicates that the current set of PDF data should be separated from the remaining file for printing operations.

Step 626 also may execute by combining the PDF files along with the divider strings to generate a single output file 111, if applicable. The separate PDF files are joined back together such that all of the PDF data from document 110 is captured in the output file. Step 628 executes by sending or transmitting the appropriate file to the applicable destination. If the PDF converter is within MFP 104, then the file is a PDF file being sent to the PDF interpreter or some other component for printing. If the PDF converter is outside MFP 104, then an output file is sent from the applicable device to MFP 104. Processing after step 628 is disclosed by FIG. 8.

FIG. 7 depicts a flowchart 700 for processing the first page of a document into a PDF file 112A according to the disclosed embodiments. Flowchart 700 may correspond with step 608 of flowchart 600. Step 608, however, is not limited by the disclosure of flowchart 700.

Step 702 executes by receiving the first page from received document 110 as identified by PDF converter 112 or 109C. The PDF converter may analyze the data on the first page to identify objects that should be used elsewhere in the document. The objects should be identified and treated separately from the regular text or data within the document. For example, the disclosed process may identify graphics, headers, footers, and the like that meet certain criteria as potential objects. Thus, step 706 executes by determining whether the object is one that may be repeated within document 110. The object may have a certain format that resembles a header, footer, document name, and the like.

If step 706 is no, then step 708 executes by determining whether the object is a graphic, such as a logo, table, picture, and the like that may be used elsewhere in the document. If step 706 or step 708 is yes, then step 710 executes by processing the object into PDF format. The object is represented by the PDF data generated after conversion. Step 712 executes by caching the object PDF data in a memory, such as memory 206, in MFP 104 or in the device connected to network 106. Alternatively, the object may be cached before processing and the conversion to PDF data performed when the page is processed. The object is provided on each page, as applicable, as it is being converted to PDF data. This action may be done by step 621 disclosed above in FIG. 6.

If the data within document 110 is not a repeated or graphic object, then step 714 executes by identifying data within the first page for processing. In some embodiments, this data may be text data. Step 716 processes the text data for the first page to convert it into the PDF format. Step 718 executes by generating the first page PDF file, shown as PDF 112A above.

Although the first page PDF file may not have the size of subsequent PDF files representing one or more complex pages, it is important to process separately so that any objects are identified and cached. This action breaks the dependencies between the PDF files. A reference library may be avoided or deleted from the PDF files. The PDF files may be processed separately as a result.

FIG. 8 depicts a flowchart 800 for processing the PDF files at PDF interpreter 114 according to the disclosed embodiments. Step 802 executes by receiving the PDF file from PDF converter 112 or 109C, depending on where the converter is located. Step 804 executes by processing the data stream using data stream processor 520 of PDF interpreter 114. Data stream processor 520 looks at the PDF data within the file to identify a divider string 402.

Step 806 executes by determining whether the data being monitored includes a divider string 402. The divider string may have a specified format, such as "% PDF" to indicate that the data should be separated for processing separately from subsequent data. If step 806 is yes, then step 808 executes by separating the processed data into a partial data file by internal job separator 522. Step 810 executes by outputting the partial data file for further processing.

If step 806 is no, then step 812 executes by determining whether an end of file string is detected. PDF interpreter 114 does not want to process data belonging to another document so the last PDF file should be identified and sent for processing. If step 812 is no, then flowchart 800 returns to step 804 to keep processing the data stream to identify any divider strings.

In the case of a PDF file generated by PDF converter 112, steps 806 and 812 are considered no, and step 814 executes by processing the PDF content within the file. For a PDF file generated by PDF converter 109C, the partial file is provided for processing. Once the data is processed for the PDF file, step 816 executes by sending it to RIP firmware 290 within MFP 104. Subsequent operations are performed in step 818 to print the file as part of printed document 102 corresponding to document 110 received for direct printing on MFP 104.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for printing a document at a printing device, the method comprising:
   receiving a document at a portable document format (PDF) converter within the printing device;
   processing a first page of the document at the PDF converter;
   caching at least one common item or graphic within the first page;
   generating a first PDF file for the first page at the PDF converter;
   evaluating page complexity of a subsequent page at the PDF converter to determine content within the page;
   determining the subsequent page of the document is a first complex page according to a complex value size for at least one data structure within the content within the subsequent page,
   wherein the at least one data structure is not text, and
   wherein the complex value size corresponds to a parameter of the printing device;
   processing the first complex page at the PDF converter along with the at least one common item or graphic from the first page;
   generating a second PDF file including the first complex page at the PDF converter; and
   printing the first PDF file and the second PDF file as an output PDF file for the document.

2. The method of claim 1, further comprising
   determining another subsequent complex page of the document is a second complex page;
   processing the second complex page at the PDF converter; and
   generating a third PDF file including the second complex page at the PDF converter.

3. The method of claim 1, further comprising
   identifying the at least one common item or graphic within the first page.

4. The method of claim 1, further comprising inserting a page divider string in the second PDF file.

5. The method of claim 1, further comprising receiving the first PDF file and the second PDF file as a combined PDF file at a PDF interpreter, wherein the PDF interpreter is located in the printing device.

6. The method of claim 1, further comprising determining the first complex page based on a page processing time of the printing device.

7. A method for printing a document at a printing device, the method comprising:
   processing a first page of the document at a portable document format (PDF) converter within the printing device;
   caching at least one common item or graphic within the first page;
   generating a first PDF file from a first page of the document at the PDF converter;
   inserting a first divider string in the first PDF file;
   evaluating page complexity of a subsequent page at the PDF converter to determine content within the page;
   determining the subsequent page of the document is a first complex page according to a complex value size for at least one data structure within the content within the subsequent page,
   wherein the at least one data structure is not text, and
   wherein the complex value size corresponds to a parameter of the printing device;
   processing the first complex page at the PDF converter along with the at least one common item or graphic from the first page;
   generating a second PDF file including the first complex page at the PDF converter;
   inserting a second divider string in the second PDF file;
   combining the first PDF file and the second PDF file into an output PDF file from the PDF converter; and
   processing the output PDF file at a PDF interpreter by
      processing the first PDF file until the first divider string is detected,
      outputting the first PDF file to print, and
      processing the second PDF file including the first complex page.

8. The method of claim 7, wherein processing the second PDF file includes processing the second PDF file until the second divider string is detected.

9. The method of claim 8, further comprising outputting the second PDF file to print.

10. The method of claim 7, further comprising generating a third PDF file having a second complex page of another subsequent page of the document.

11. The method of claim 7, wherein the parameter of the printing device includes page processing time, disk size, memory size, or printing speed of the printing device.

12. The method of claim 7, further comprising transmitting the output PDF file from the PDF converter to the PDF interpreter over a network, wherein the PDF converter is located outside the printing device.

13. A system to print a document at a printing device, the system comprising:
   a portable document format (PDF) converter on the printing device configured to
      process a first page of the document,
      cache at least one common item or graphic within the first page,
      generate a first PDF file of the first page of the document,
      evaluate page complexity of a subsequent page to determine content within the page,
      determine the subsequent page of the document is a first complex page according to a complex value size for at least one data structure within the content within the subsequent page,
      wherein the at least one data structure is not text, and
      wherein the complex value size corresponds to a parameter of the printing device,
      process the first complex page at the PDF converter along with the at least one common item or graphic from the first page,
      generate a second PDF file including the first complex page
      combine the first PDF file and the second PDF file into an output PDF file; and
   a PDF interpreter configured to
      receive the output PDF file including the first PDF file and the second PDF file,
      process the first PDF file,
      output the processed first PDF file for printing,
      process the second PDF file including the first complex page, and
      output the processed second PDF file for printing.

14. The system of claim 13, wherein the PDF converter is located on a device on a network connected to the printing device and the PDF interpreter is located within the printing device.

15. The system of claim 13, wherein the PDF converter is further configured to
   insert a first page divider string into the first PDF file, and
   insert a second page divider string into the second PDF file.

16. The system of claim 15, wherein the PDF interpreter is further configured to
   end processing of the first PDF file at the first page divider string to output the processed first PDF file, and
   end processing of the second PDF file at the second page divider string to output the processed second PDF file.

17. The system of claim 13, wherein the PDF converter is further configured to
   determine another subsequent page of the document is a second complex page, and
   generate a third PDF file including the second complex page.

* * * * *